United States Patent
Sakuraba

(10) Patent No.: US 9,235,810 B2
(45) Date of Patent: Jan. 12, 2016

(54) EVENT ANALYSIS APPARATUS, NON-TRANSITORY COMPUTER-READABLE STORAGE MEDIUM STORING COMPUTER PROGRAM ANALYZING EVENTS, AND METHOD FOR ANALYZING EVENTS OVER VARIABLE TIME WIDTH

(71) Applicant: Yokogawa Electric Corporation, Musashino-shi, Tokyo (JP)

(72) Inventor: Yuichi Sakuraba, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 241 days.

(21) Appl. No.: 14/107,573

(22) Filed: Dec. 16, 2013

(65) Prior Publication Data
US 2014/0188779 A1 Jul. 3, 2014

(30) Foreign Application Priority Data
Dec. 27, 2012 (JP) ................................. 2012-284529

(51) Int. Cl.
G06N 7/02 (2006.01)
G06N 7/06 (2006.01)
G06F 9/44 (2006.01)
G06N 7/00 (2006.01)
G05B 23/02 (2006.01)

(52) U.S. Cl.
CPC ............ *G06N 7/005* (2013.01); *G05B 23/0275* (2013.01)

(58) Field of Classification Search
None
See application file for complete search history.

(56) References Cited

U.S. PATENT DOCUMENTS

2007/0192064 A1* 8/2007 Nakamura ............. G06Q 10/06
  702/127
2008/0209517 A1* 8/2008 Nightingale ........ H04L 63/1416
  726/3

FOREIGN PATENT DOCUMENTS

JP 2007-164463 A 6/2007
JP 2010-122847 A 6/2010

OTHER PUBLICATIONS

Xu et al. "Intrusion Detection using Continuous Time Bayesian Networks", J. AIR 39, 2010, pp. 745-774.*
Han et al. "Mining Segment-Wise Periodic Patterns in Time-Related Databases", KDD 1998, pp. 5.*

(Continued)

*Primary Examiner* — Li-Wu Chang
(74) *Attorney, Agent, or Firm* — Westerman, Hattori, Daniels & Adrian, LLP

(57) ABSTRACT

An event analysis apparatus configured to analyze events including alarms generated in a plurality of devices and operations targeting the devices is provided. The event analysis apparatus includes an event log collection unit configured to collect an event log including an occurrence date and time of the event, a device identifier (ID) of the device in which the event occurs, and an event type ID of the event, an event log storage unit configured to convert the event log into an event matrix representing presence and absence of occurrence of each device event obtained by coupling the device ID and the event type ID in time series and save the event matrix; and an event analysis unit configured to calculate a conditional probability between the device events to construct a Bayesian network by dividing the event matrix into blocks, each of which has a predetermined reference time width and determining the presence and absence of the occurrence of each of the device events in each of the blocks, and decide a device event as a cause of a device event of an analysis target or a device event to be generated later using the constructed Bayesian network.

12 Claims, 10 Drawing Sheets

(56) References Cited

OTHER PUBLICATIONS

Pearl, Judea, "Probabilistic Reasoning in Intelligent Systems:Networks of Plausible Inference", Morgan Kaufmann Publishers, Inc., San Francisco, California USA, 1988.

Suyari, Hiroki, "Introduction to Bayesian Network (1)", Medical Imaging Technology, Japan, 2003, vol. 21 No. 4, pp. 315-318; w/English partial translation.

* cited by examiner

| DATE AND TIME | DEVICE ID | EVENT ID |
|---|---|---|
| 2012/10/21 18:00:00 | TAG1 | ALARM1 |
| 2012/10/21 18:00:03 | TAG2 | OP1 |
| 2012/10/21 18:00:04 | TAG3 | ALARM2 |
| 2012/10/21 18:00:06 | TAG2 | ALARM3 |

*FIG. 4*

| DATE AND TIME | TAG1:ALARM1 | TAG2:ALARM3 | TAG2:OP1 | TAG3:ALARM2 |
|---|---|---|---|---|
| 2012/10/21 18:00:00 | ○ | | | |
| 2012/10/21 18:00:01 | | | | |
| 2012/10/21 18:00:02 | | | | |
| 2012/10/21 18:00:03 | | | ○ | |
| 2012/10/21 18:00:04 | | | | ○ |
| 2012/10/21 18:00:05 | | | | |
| 2012/10/21 18:00:06 | | ○ | | |
| ⋮ | ⋮ | ⋮ | ⋮ | ⋮ |

*FIG. 6*

| DEVICE EVENT | OCCURRENCE PROBABILITY |
|---|---|
| TAG1:ALARM1 | 5.2% |
| TAG2:ALARM3 | 1.8% |
| TAG2:OP1 | 3.7% |
| TAG3:ALARM2 | 8.4% |

| DEVICE EVENT PAIR | SIMULTANEOUS OCCURRENCE PROBABILITY |
|---|---|
| TAG1:ALARM1   TAG2:ALARM3 | 0.41% |
| TAG1:ALARM1   TAG2:OP1 | 0.58% |
| TAG1:ALARM1   TAG3:ALARM2 | 0.31% |
| TAG2:ALARM3   TAG2:OP1 | 0.95% |
| TAG2:ALARM3   TAG3:ALARM2 | 0.84% |

⋮ ⋮

US 9,235,810 B2

EVENT ANALYSIS APPARATUS, NON-TRANSITORY COMPUTER-READABLE STORAGE MEDIUM STORING COMPUTER PROGRAM ANALYZING EVENTS, AND METHOD FOR ANALYZING EVENTS OVER VARIABLE TIME WIDTH

BACKGROUND OF THE INVENTION

1. Field of the Invention

The present invention relates to an event analysis apparatus which analyzes events such as an alarm generated in an industrial plant or an operation procedure of an operator and extracts a cause-and-effect relationship of the event, a non-transitory computer-readable storage medium storing a computer program analyzing the events, and a method for analyzing the events.

Priority is claimed on Japanese Patent Application No. 2012-284529, filed Dec. 27, 2012, the content of which is incorporated herein by reference.

2. Description of Related Art

In a distributed control system or the like which controls a field device group of a sensor, an actuator, etc. using control systems such as field controllers distributed and arranged in an industrial plant, an event analysis apparatus which acquires and analyzes events such as an alarm generated in the plant or an operation procedure of an operator is known.

FIG. 12 is a block diagram illustrating a configuration of an event analysis apparatus of the related art. As illustrated in FIG. 12, the event analysis apparatus 300 includes an event log collection unit 310 and an event display unit 320.

Events such as operation recording of an operator for a control system 340 or an alarm may be saved by the control system 340 as a log and saved by a historian 350. The event log collection unit 310 collects the event log from either or both sides and records the collected event log on a storage device provided internally or externally.

The event log collection unit 310 performs a statistical process of calculating an occurrence frequency or ratio of each event or the like for a collected event group, and displays an event list, a histogram indicating situations of the occurred events, a result of the statistical process, etc. on a display device 330 via the event display unit 320. A user can promote efficiency improvement of plant operation and the like by referring to information displayed on the display device 330.

The related art is disclosed in Japanese Unexamined Patent Application, First Publication No. 2007-164463, J. Pearl, "Probabilistic Reasoning in Intelligent Systems: Networks of Plausible Inference," Morgan Kaufmann, 1988, and Hiroki Suyari, "Introduction to Bayesian Network (1)," MEDICAL IMAGING TECHNOLOGY, Vol. 21, No. 4, September 2003.

SUMMARY OF THE INVENTION

Events such as an alarm generated in an industrial plant or an operation procedure of an operator are usually not independent and has mutual relevance. For example, there is a case in which when a certain alarm is caused by a specific operation or a case in which another alarm is generated subsequent to the certain alarm.

Since only analysis such as a simple statistical process is performed in the event analysis apparatus in the related art, a user needs to estimate a relation between the events. If the cause-and-effect relationship between the occurred events can be understood through analysis, the analysis makes an estimation of a cause of one event and a prediction of other event to occur after one event easy. Such analysis is convenient to the user.

An aspect of the present invention provides an event analysis apparatus capable of finding a cause-and-effect relationship between events, a non-transitory computer-readable storage medium storing a computer program analyzing the events, and a method for analyzing the events.

According to one aspect of the present invention, an event analysis apparatus configured to analyze events including alarms generated in a plurality of devices and operations targeting the devices is provided. The event analysis apparatus may include an event log collection unit configured to collect an event log including an occurrence date and time of the event, a device identifier (ID) of the device in which the event occurs, and an event type ID of the event, an event log storage unit configured to convert the event log into an event matrix representing presence and absence of occurrence of each device event obtained by coupling the device ID and the event type ID in time series and save the event matrix, and an event analysis unit configured to calculate a conditional probability between the device events to construct a Bayesian network by dividing the event matrix into blocks, each of which has a predetermined reference time width and determining the presence and absence of the occurrence of each of the device events in each of the blocks, and decide a device event as a cause of the device event of an analysis target or a device event to be generated later using the constructed Bayesian network.

In the event analysis apparatus as described above, the event log storage unit may be configured to set the time series of the event matrix in a minimum time unit width of the event log.

In the event analysis apparatus as described above, the reference time width may be variable.

In the event analysis apparatus as described above, the event analysis unit may be configured to calculate the conditional probability between the device events by calculating individual occurrence probabilities of the device events and a simultaneous occurrence probability between the device events based on the presence and absence of the occurrence of each of the device events in each of the blocks.

In the event analysis apparatus as described above, the event analysis unit may be configured to calculate the individual occurrence probability by setting the device event of a target, and dividing the number of the blocks in which the device event targeted has occurred by the total number of the blocks, and to calculate the simultaneous occurrence probability by setting a pair of the device events, and dividing the number of the blocks in which both the device events included in the pair have occurred by the total number of the blocks.

According to another aspect of the present invention, a non-transitory computer-readable storage medium storing a computer program for analyzing events including alarms generated in a plurality of devices and operations targeting the devices is provided. The computer program may be executed to perform collecting an event log including an occurrence date and time of the event, a device ID of the device in which the event occurs, and an event type ID of the event, converting the event log into an event matrix representing presence and absence of occurrence of each device event obtained by coupling the device ID and the event type ID in time series and saving the event matrix, calculating a conditional probability between the device events to construct a Bayesian network by dividing the event matrix into blocks, each of which has a predetermined reference time width and determining the presence and absence of the occurrence of each of the device events in each of the blocks, and deciding a device event as a cause of a device event of an analysis target or a device event to be generated later using the constructed Bayesian network.

In the non-transitory computer-readable storage medium as described above, the computer program may be executed to perform setting the time series of the event matrix in a minimum time unit width of the event log.

In the non-transitory computer-readable storage medium as described above, the reference time width may be variable.

In the non-transitory computer-readable storage medium as described above, the computer program may be executed to perform calculating the conditional probability between the device events by calculating individual occurrence probabilities of the device events and a simultaneous occurrence probability between the device events based on the presence and absence of the occurrence of each of the device events in each of the blocks.

In the non-transitory computer-readable storage medium as described above, the computer program may be executed calculating the individual occurrence probability by setting the device event of a target, and dividing the number of the blocks in which the device event targeted has occurred by the total number of the blocks, and calculating the simultaneous occurrence probability by setting a pair of the device events, and dividing the number of the blocks in which both the device events included in the pair have occurred by the total number of the blocks.

According to another aspect of the present invention, a method for analyzing events including alarms generated in a plurality of devices and operations targeting the devices is provided. The method may be include collecting an event log including an occurrence date and time of the event, a device ID of the device in which the event occurs, and an event type ID of the event, converting the event log into an event matrix representing presence and absence of occurrence of each device event obtained by coupling the device ID and the event type ID in time series and saving the event matrix, calculating a conditional probability between the device events to construct a Bayesian network by dividing the event matrix into blocks, each of which has a predetermined reference time width and determining the presence and absence of the occurrence of each of the device events in each of the blocks, and deciding a device event as a cause of a device event of an analysis target or a device event to be generated later using the constructed Bayesian network.

In the method as described above, converting the event log into the event matrix and saving the event matrix may include setting the time series of the event matrix in a minimum time unit width of the event log.

In the method as described above, the reference time width may be variable.

In the method as described above, calculating the conditional probability to construct the Bayesian network may include calculating the conditional probability between the device events by calculating individual occurrence probabilities of the device events and a simultaneous occurrence probability between the device events based on the presence and absence of the occurrence of each of the device events in each of the blocks.

In the method as described above, calculating the conditional probability to construct the Bayesian network may include calculating the individual occurrence probability by setting the device event of a target, and dividing the number of the blocks in which the device event targeted has occurred by the total number of the blocks, and calculating the simultaneous occurrence probability by setting a pair of the device events, and dividing the number of the blocks in which both the device events included in the pair have occurred by the total number of the blocks.

BRIEF DESCRIPTION OF THE DRAWINGS

FIG. 4 is a diagram illustrating an example of an event matrix.

FIG. 6 is a diagram illustrating an example of an occurrence probability of a device event.

FIG. 7 is a diagram illustrating an example of a simultaneous probability of device events.

DETAILED DESCRIPTION OF THE INVENTION

Figure 1:
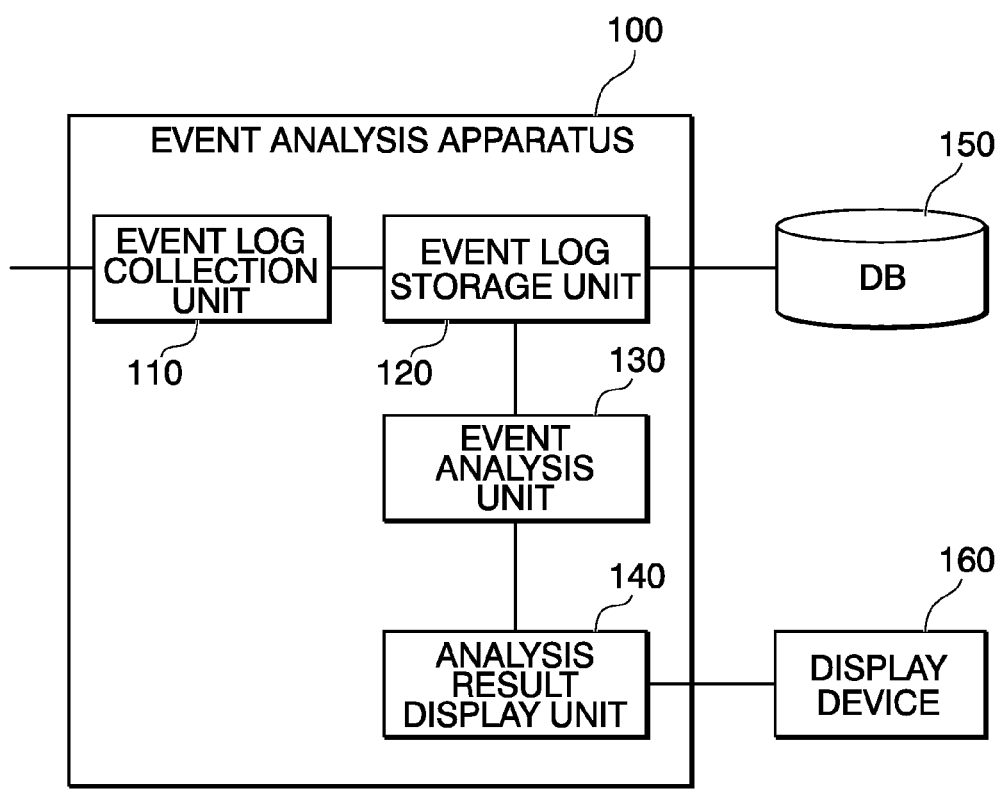
FIG. 1 is a block diagram illustrating a configuration of an event analysis apparatus according to one embodiment.

An embodiment of the present invention will be described with reference to the drawings. FIG. 1 is a block diagram illustrating a configuration of an event analysis apparatus according to the embodiment. As illustrated in FIG. 1, an event analysis apparatus 100 includes an event log collection unit 110, an event log storage unit 120, an event analysis unit 130, and an analysis result display unit 140.

The event analysis apparatus 100 may be configured using a general-purpose information processing apparatus such as a personal computer or a server. That is, the information processing apparatus includes a non-transitory computer-readable storage medium storing a computer program for performing a process to be described hereinafter and executes this computer program to function as the event analysis apparatus 100. Of course, the event analysis apparatus 100 may be configured as a dedicated apparatus.

As in the related art, the event log collection unit 110 collects an event log from a control system, a historian, or the like connected to the event log collection unit 110. The event log includes a date and time when an event occurred, an ID (tag) of a device in which the event occurred, an ID of an event type, etc.

The event log storage unit 120 records and manages the event log collected by the event log collection unit 110 on a database (DB) 150. When the event log is recorded on the DB 150, the event log storage unit 120 converts the event log into a format suitable for analysis to be performed by the event analysis unit 130.

Specifically, a matrix in which a time axis of a minimum time unit of the event log is set in a vertical direction and items obtained by coupling device IDs and event type IDs are arranged in a horizontal direction is created. Next, a process of converting the event included in the event log into a format in which a check is input to a column corresponding to a date and time when the event occurred, a device in which the event occurred, and an event type is performed.

Hereinafter, data obtained by converting the event log is referred to as an "event matrix," and a combination of a device and an event type is referred to as a "device event." For example, an event "ALARM1" occurring in a device "TAG1" is represented as a device event "TAG1: ALARM1."

A distributed DB such as NoSQL which can record a large-volume event matrix and is flexible to horizontal scalability may be used as the DB 150 recording the event matrix. The distributed DB can be flexibly applied to a case that the event matrix has a large volume, or that the number of devices in plant operation is varied. A relational DB (RDB) may be used.

The event analysis unit 130 is a functional unit which analyzes a cause-and-effect relationship between device events using a Bayesian network. Thus, the event analysis unit 130 performs a process of constructing the Bayesian network based on an event matrix created by the event log storage unit 120, a process of analyzing a device event causing a device event of an analysis target and a device event which is predicted to be generated later using the Bayesian network, and a process of displaying an analysis result on a display device 160 via the analysis result display unit 140.

A Bayesian network is one graphical model in which a cause-and-effect relationship is described using a probability and is a model of probabilistic reasoning in which reasoning of a complex cause-and-effect relationship is represented by a directed graph structure and a relationship between individual variables is represented by a conditional probability. In the present invention, the Bayesian network means a graph in which the device events are connected each other by a unidirectional arrow, an occurrence probability is assigned to each of the device events, and a conditional probability of the device event serving as an end point of the arrow in relation to the device event serving as a start point of the arrow is assigned to the device event serving as the end point of the arrow.

It is possible to predict the likelihood or possibility of a complex or uncertain event by representing a causal feature as a network by a directed graph and performing a probabilistic reasoning thereon. It is possible to quantitatively represent an occurrence probability of the cause-and-effect relationship according to a complex path by obtaining probabilities in which the event occurs in respective cases based on information accumulated previously and calculating them according to a path in which the event occurs.

It is possible to probabilistically represent the device event causing a certain device event using the Bayesian network. In addition, it is possible to probabilistically represent a device event which can occur after the certain device event has occurred. Further, it is also possible to include an element such as seasonal fluctuation or regular repair in analysis by constructing the Bayesian network using a long-term event log.

Next, an operation of the event analysis apparatus 100 will be described. First, operations of the event log collection unit 110 and the event log storage unit 120 will be described with reference to the flowchart of FIG. 2. When a predetermined collection timing has been reached (S101: Yes), the event log collection unit 110 collects an event log from the control system, the historian, etc. (S102).

Figures 2, 3:
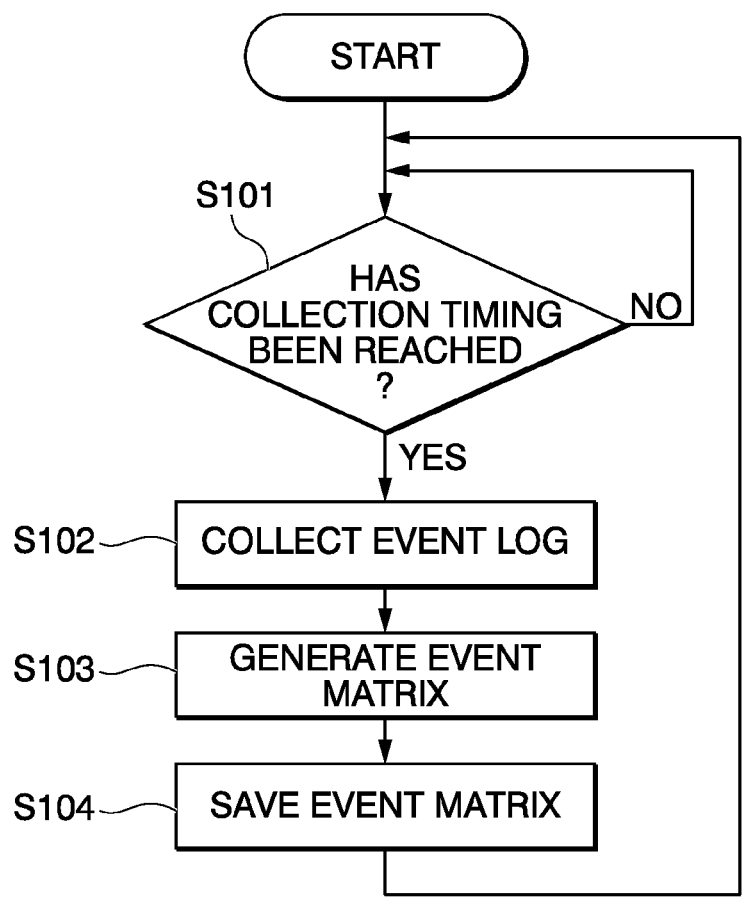
FIG. 2 is a flowchart illustrating operations of an event log collection unit and an event log storage unit.
FIG. 3 is a diagram illustrating an example of an event log.

As illustrated in an example of FIG. 3, the event log includes a date and time when the event occurred, a device ID (tag), and an event ID. The example of FIG. 3 represents that an alarm "ALARM1" was generated in a device "TAG1" on 2012 Oct. 21 18:00:00 and an operation "OP1" was performed on a device "TAG2" on 2012 Oct. 21 18:00:03.

The timing at which the event log is collected may be designated according to a fixed cycle, an instruction from the user, a predetermined trigger, or the like and is preset.

When the event log is collected, the event log storage unit 120 creates the event matrix based on the event log (S103). As described above, the event matrix is obtained by creating a matrix in which a time axis of a minimum time unit of the event log is set in a vertical direction and device events are arranged in a horizontal direction and converting the matrix into a format in which a check is input to a column corresponding to a date and time when an event occurred, a device in which the event occurred, and an event type for the event included in the event log.

FIG. 4 illustrates an event matrix obtained by converting the event log illustrated in FIG. 3. In the event matrix illustrated in FIG. 4, because the minimum time unit of the event log is set to 1 sec, the vertical direction of the event matrix is every second. In addition, because device events in which a device ID and an event type ID are coupled are arranged in the horizontal direction, columns of "TAG1: ALARM1," "TAG2: ALARM3," and "TAG2: OP1", etc. are set. Actually, columns for all combinations of the devices and the event types are set in the horizontal direction.

Because the alarm "ALARM1" occurred in the device "TAG1" on 2012 Oct. 21 18:00:00 in this example, a check "o" was input to a corresponding column. Likewise, because the operation "OP1" was performed on the device "TAG2" on 2012 Oct. 21 18:00:03, a check was input to the corresponding column.

When the event matrix is created, the event log storage unit 120 records the created event matrix on the DB 150 (S104). At this time, the event matrix may be recorded additionally so that past data is available. Thereafter the event log collection unit 110 waits for the next collection timing (S101).

Figure 5:
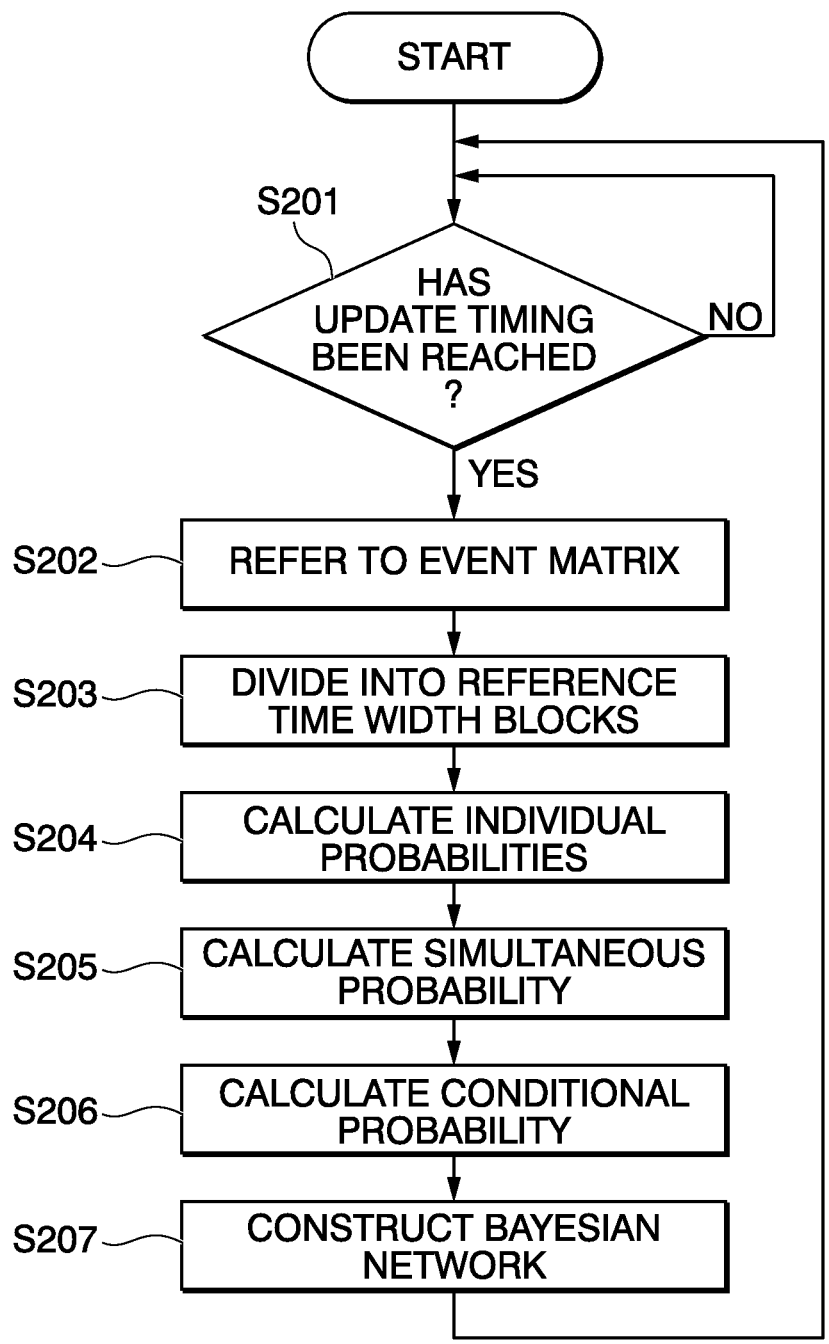
FIG. 5 is a flowchart illustrating a process in which the event analysis unit constructs a Bayesian network based on the event matrix.

Next, a process in which the event analysis unit 130 constructs the Bayesian network based on the event matrix will be described with reference to the flowchart of FIG. 5. When a predetermined update timing has been reached (S201: Yes), the event analysis unit 130 refers to an event matrix recorded on the DB 150 (S202). That is, the Bayesian network is configured to be updated at a predetermined timing. The timing at which the Bayesian network is updated may be designated according to a fixed cycle, an instruction from the user, a predetermined trigger, or the like and is preset.

Individual occurrence probabilities of respective device events and a conditional probability between the device events are necessary to construct the Bayesian network. In order to calculate these probabilities, a certain time width, for example, 10 minutes or 1 hour is set as a reference time width in this embodiment. That is, the occurrence probability represents a probability of occurrence within the reference time width. A range from the start to the end of the time axis of the event matrix is divided into a plurality of blocks having the reference time width (S203).

The reference time width may be set according to an industrial plant of an analysis target. For example, when an industrial plant based on a device in which there is no delay element such as a flow rate or a pressure is analyzed, the reference time width may be shortened. On the other hand, when an industrial plant based on a device in which there is a primary delay element such as a temperature is analyzed, the reference time width may be lengthened.

When there are various devices in the plant, analysis may be performed by setting a plurality of reference time widths rather than a single reference time width and constructing the Bayesian network according to each time width. In order to facilitate this process, the time axis may be set in the minimum time unit of the event log for the event matrix.

The device event of the target is set, it is determined whether the device event of the target has occurred at least once, and the number of blocks in which the device event has occurred is counted. The count value is divided by the number of blocks of the entire period to calculate an occurrence probability of a device event of a target. This process is performed on all device events to calculate the occurrence probability of each device event as illustrated in FIG. 6 (S204).

Next, a pair of device events of a target is set and the number of blocks in which both the device events have occurred is counted. A simultaneous probability for the device event pair of the target is calculated by dividing the count value by the number of blocks of the entire period. This process is performed on all device event pairs to calculate the simultaneous occurrence probability of each device event pair as illustrated in FIG. 7 (S205).

A conditional probability between device events is calculated from the individual occurrence probabilities of the device events and the simultaneous occurrence probability of the device event pair (S206). Here, the conditional probability is a probability that a device event 13 occurs when a device event A has occurred, and may be calculated according to Bayes' theorem from individual occurrence probabilities of the device events A and B and a simultaneous occurrence probability of the device events A and B. Specifically, the probability that the device event B occurs when the device event A has occurred is calculated by dividing the simultaneous occurrence probability of the device events A and B by the individual occurrence probability of the device event A.

Ultimately, the Bayesian network is constructed from the conditional probability between the device events (S207). A known technique such as a maximum weighted spanning tree (MWST) method or a K2 method or other techniques for construction of the Bayesian network may be used. The cause-and-effect relationship between the device events is extracted using mutual information of an arbitrary device event pair in the MWST method and using information criterion in the K2 method. Both the mutual information and the information criterion are calculated based on the occurrence probabilities of the device events and the conditional probability between the events.

An example of a method for constructing the Bayesian network using the K2 method will be described. In the K2 method, a structure hypothesis of each event in relation to a parent candidate is generated. The structure hypothesis is evaluated using the information criterion to estimate a graph structure. The information criterion includes a Cooper method, MDL (Minimum Description Length), or the like. Hereinafter, the MDL will be described. When the MDL is used, MDL values are calculated by a following equation. By using the MDL values, a parent node is decided.

$$-\sum_{i=1}^{k}\sum_{j=0}^{l} n_{ij}\log\frac{n_{ij}}{n_i} + \frac{1}{2}k(\log N)$$

$n_{ij}$: number of events in which a value of the event is j, given a value of an i-th parent variable is selected
k: number of the parent variables ($k=2^{number\ of\ parent\ nodes}$)
N: number of data If the K2 method is used, it is necessary to previously determine an occurrence order of the events of analysis targets. A method for determining the occurrence order of the events is as follows:

Step 1. Dividing an event log every time windows, each of which has a constant time width $\Delta t$, from a record start time of the event log($T_{start}$);

Step 2. Recording the events occurred between $T_{start}$+(k−1)$\Delta t$ and $T_{start}$+k$\Delta t$ (k=1, 2, 3 . . . ) and the occurrence order (or difference between an occurrence time of the event and $T_{start}$+(k−1)$\Delta t$);

Step 3. Setting event pairs from all of the events included in a group, and repeatedly executing following steps 4 and 5 for each of the event pairs Pair ($e_i$, $e_j$) ($e_i \neq e_j$);

Step 4. If both $e_i$ and $e_j$ are found between $T_{start}$+(k−1)$\Delta t$ and $T_{start}$+k$\Delta t$ (k=1, 2, 3 . . . ) in the record obtained in Step 2 described above, incrementing $N_{i \rightarrow j}$ in case where the occurrence order is from $e_i$ to $e_j$, incrementing $N_{i \rightarrow j}$ in case where the occurrence order is from $e_j$ to $e_i$, and incrementing $N_{i \sim j}$ in case where the $e_i$ and $e_j$ occur almost simultaneously (for example, within one minutes);

Step 5. Comparing the values of $N_{i \rightarrow j}$, $N_{j \rightarrow i}$ and $N_{i \sim j}$ to select the occurrence order having the largest value among $N_{i \rightarrow j}$, $N_{j \rightarrow i}$ and $N_{i \sim j}$, and defining the selected occurrence order as the occurrence order of $e_i$ and $e_j$. The process is return to Step 2;

Step 6. Determining the occurrence order of all of the events in accordance with the occurrence order of each of the event pairs.

After the occurrence order of all of the events have been determined, the Bayesian network is constructed in accordance with following procedures:

Step 1. Sorting the events in occurrence order;
$E_g = \{e_1, e_2, \ldots, e_k\}$
k: number of the events included in the group
occurrence order of the events: $e_1 \rightarrow e_2 \rightarrow \ldots e_k$ Step 2. Repeatedly executing following steps 3 to 7 for each of the events $e_i$ (i=1, 2, . . . , k) in the group;

Step 3. Defining the event $e_i$ as a root, which does not have a parent node, and evaluating the event $e_i$ using MDL information criterion. Since the event $e_i$ does not have a parent node, an equation of the MDL is as follows:

$$-n_{e_i=1}\log p(e_i = 1) - n_{e_i=0}\log p(e_i = 0) + \frac{1}{2}\log N$$

Step 4. Defining the event $e_i$ as a child node, searching an event $e_p$ (p<i) which occurs before the event $e_i$, and evaluating each event $e_p$ (p<i) as a candidate of a parent node using following MDL information criterion;

$$-n_{e_i=0,e_p=0}\log P(e_i=0 \mid e_p=0) - n_{e_i=0,e_p=0}\log P(e_i=1 \mid e_p=0)$$
$$-n_{e_i=0,e_p=0}\log P(e_i=0 \mid e_p=1) - n_{e_i=0,e_p=0}\log P(e_i=1 \mid e_p=1) + \frac{2}{2}(\log N)$$

Step 5. If the MDL value obtained in Step 3 is smaller than all of the MDL values obtained in Step 4, defining the event $e_i$ as the root and returning to Step 2. If the MDL value obtained in Step 3 is not smaller than all of the MDL values obtained in Step 4, selecting the event, which has the smallest MDL value, from the candidates of the parent node $e_p$ (p<i);

Step 6. If there is the non-selected candidate of the parent node, adding the non-selected candidates of the parent node singly to the parent nodes which are already selected, and recalculate the MDL values of the candidates of the parent nodes;

Step 7. If the MDL value of the parent nodes which are already selected is smaller than all of the MDL values obtained in Step 6, defining the selected node as the parent node of the event $e_i$ and returning to Step 2. If the MDL value of the parent nodes which are already selected is not smaller than all of the MDL values obtained in Step 6, selecting the combination of the parent nodes in which the smallest MDL value is obtained in Step 6, and returning to Step 6.

Figure 8A:
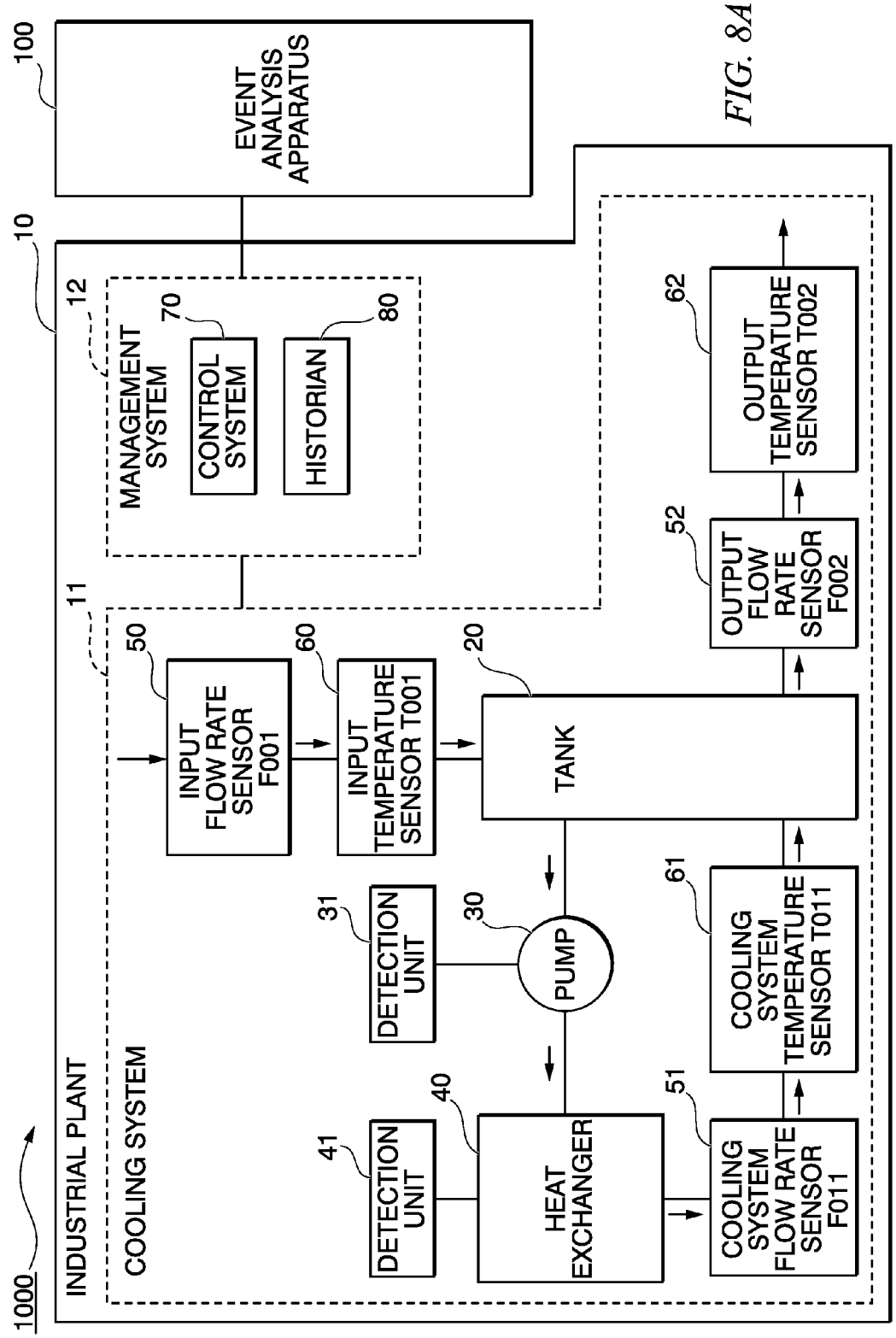
FIG. 8A is a diagram illustrating an example of an industrial plant in which control is performed to cool and output input liquid.
Figure 8B:
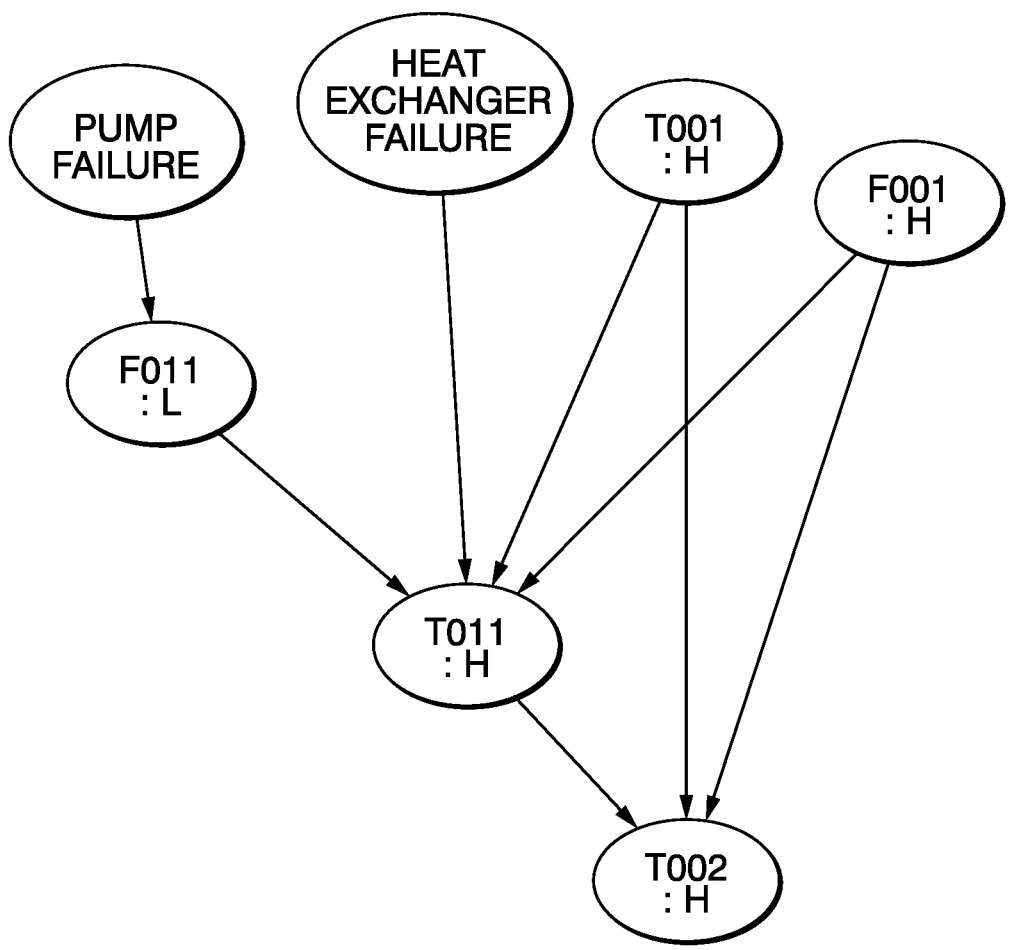
FIG. 8B is a diagram illustrating an example of the Bayesian network constructed in the industrial plant illustrated in FIG. 8A.

FIG. 8A illustrates an example of an industrial plant in which control is performed to cool and output input liquid. An industrial plant 10 illustrated in FIG. 8A includes a cooling system 11 configured to cool and output input liquid, and a management system 12 configured to store events such as an alarm of each device included in the cooling system 11. The cooling system 11 includes a tank 20 configured to store the input liquid, a pump 30 configured to convey the input liquid to a heat exchanger 40, the heat exchanger 40 configured to cool the input liquid. The flow rate of the liquid to be input into the tank 20 is measured by an input flow rate sensor F001 (50). The temperature of the liquid to be input into the tank 20 is measured by an input temperature sensor T001 (60). The flow rate of the liquid cooled by the heat exchanger 40 is measured by a cooling system flow rate sensor F011 (51). The temperature of the liquid cooled by the heat exchanger 40 is measured by a cooling system temperature sensor T011 (61). The flow rate of the liquid output from the tank 20 is measured by an output flow rate sensor F002 (52). The temperature of the liquid output from the tank 20 is measured by an output temperature sensor T002 (62). A detection unit 31 configured to detect a failure of the pump 30 is connected to the pump 30. A detection unit 41 configured to detect a failure of the heat exchanger 40 is connected to the heat exchanger 40. The management system 12 includes a control system 70 and a historian 80. The events such as the alarm of each device included in the cooling system 11 are stored into the control system 70 and/or the historian 80. The event analysis apparatus 100 is configured to collect an event log from the control system 70 and/or the historian 80 and to analyze the event log. FIG. 8B illustrates an example of the Bayesian network constructed in the industrial plant 10 illustrated in FIG. 8A. In this example, "Pump: Failure," "Heater Exchanger: Failure," "Input Flow Rate Sensor FO11: Low Alarm," etc. are set as the device event.

Figure 9:
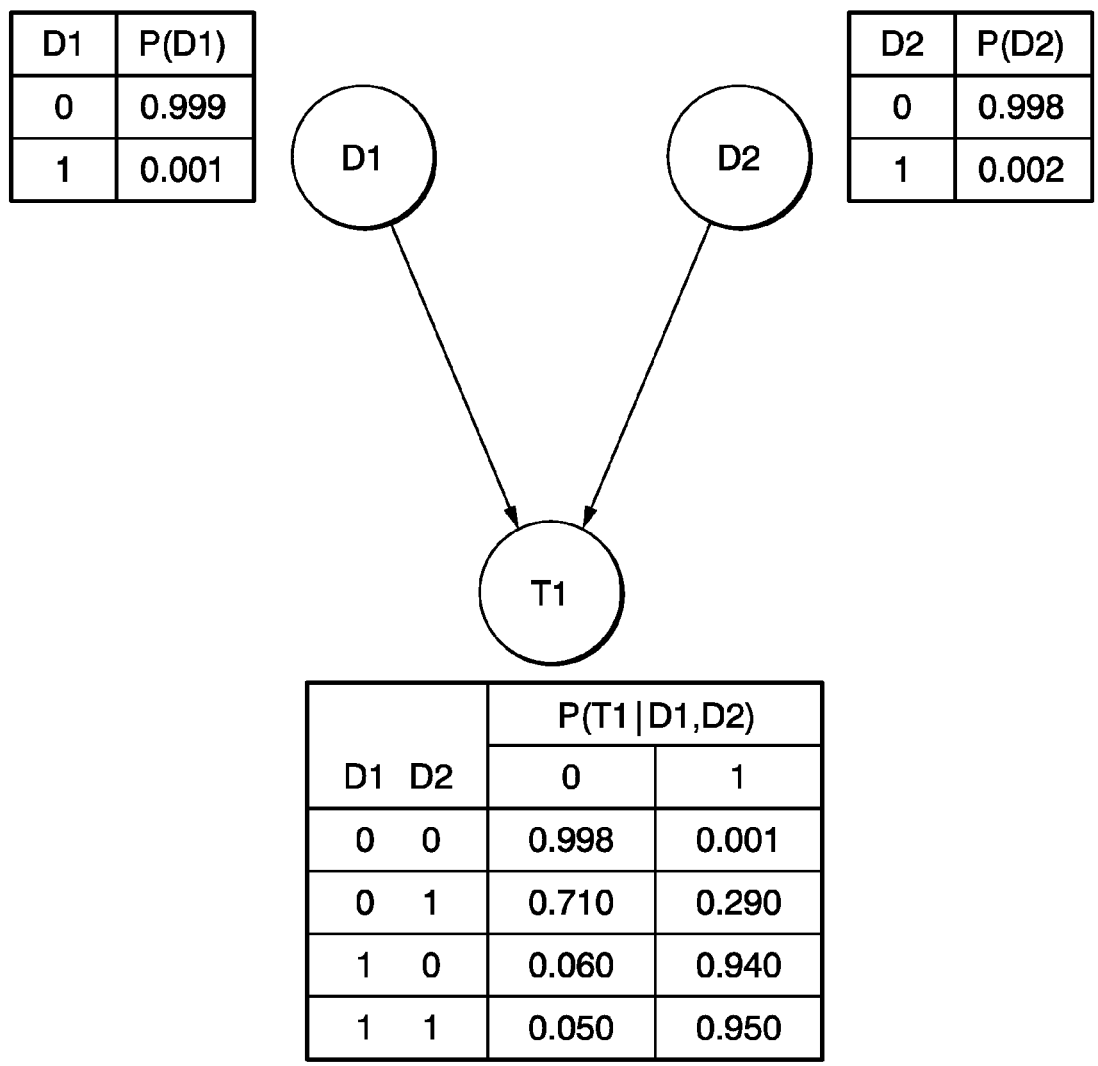
FIG. 9 is a diagram illustrating a probability assigned to a node of the Bayesian network.

As illustrated in FIG. 8B, the Bayesian network is represented in the form in which each device event is represented by a node and the nodes are connected by a unidirectional arrow each other. In the Bayesian network, a probability is assigned to each node and conditional probabilities of a node serving as an end point of the arrow in relation to parent nodes are assigned to the node serving as the end point of the arrow as illustrated in FIG. 9. In FIG. 9, an individual non-occurrence probability (D1=0) of a device event D1 as a parent node is 0.999, and an individual occurrence probability (D1=1) of the device event D1 is 0.001. On the other hand, an individual non-occurrence probability (D2=0) of a device event D2 as a parent node is 0.998, and an individual occurrence probability (D2=1) of the device event D2 is 0.002. For example, when the device event D1 occurs (D1=1) and the device event D2 occurs (D2=1), a conditional probability in which a device event T1 occurs (P(T1|D1, D2)=1) is 0.950, while a conditional probability in which the device event T1 does not occur (P(T1|D1, D2)=0) is 0.050.

Figure 10:
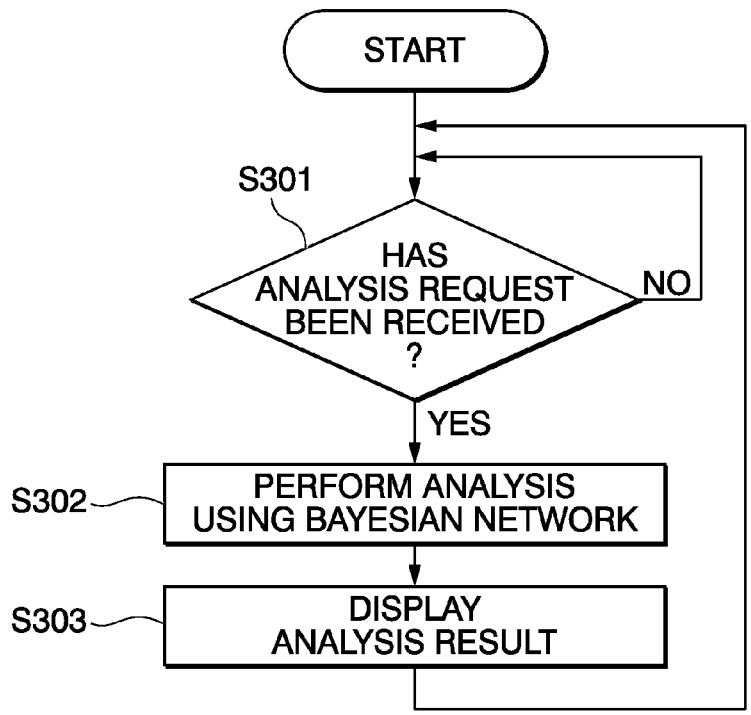
FIG. 10 is a flowchart illustrating a process in which the event analysis unit analyzes events using the Bayesian network.

Next, a process in which the event analysis unit 130 analyzes a device event causing the device event of an analysis target and a device event to be predicted using the Bayesian network will be described with reference to the flowchart of FIG. 10.

Upon receiving an analysis request from the user (S301: Yes), the event analysis unit 130 performs analysis using the Bayesian network (S302). The user, for example, may send the analysis request to the event analysis unit 130 for an alarm that has occurred or an alarm that occurs frequently and an operation intended to be performed after this, etc. In addition, the user may send the analysis request offline for efficiency improvement of an industrial plant or the like.

In analysis using the Bayesian network, it is also possible to calculate the device event causing the device event of the analysis target and the device event to occur later, and probabilities thereof using a probability propagation algorithm.

The probability propagation algorithm is represented as follows. In the Bayesian network, given observation information from upstream is defined as $e^+$ and observation information from downstream is defined as $e^-$, a conditional probability of a variable $X_j$ is represented by an equation as follows:

$$P(X_j|e^-,e^+) = \alpha P(e^-|X_j)P(X_j|e^+)$$

In the equation described above, given a probability in which the process propagates from the parent node to Xj is defined as $\pi(X_j)=P(X_j|e^+)$ and a probability in which the process propagates from the child node to Xj is defined as $\lambda(X_j)=P(e^-|X_j)$, $P(X_j|e^-,e^+)$ is transformed as follows:

$$P(X_j \mid e^-, e^+) = \alpha \lambda(X_j)\pi(X_j)$$

$$\pi(X_j) = \sum_{X_{j-1}} P(X_j \mid X_{j-1})\pi(X_{j-1})$$

$$\lambda(X_j) = \sum_{X_{j+1}} \lambda(X_{j+1})P(X_{j+1} \mid X_j)$$

By calculating recursively the transformation described above, $P(X_j|e^-,e^+)$ is obtained.

Figure 11:
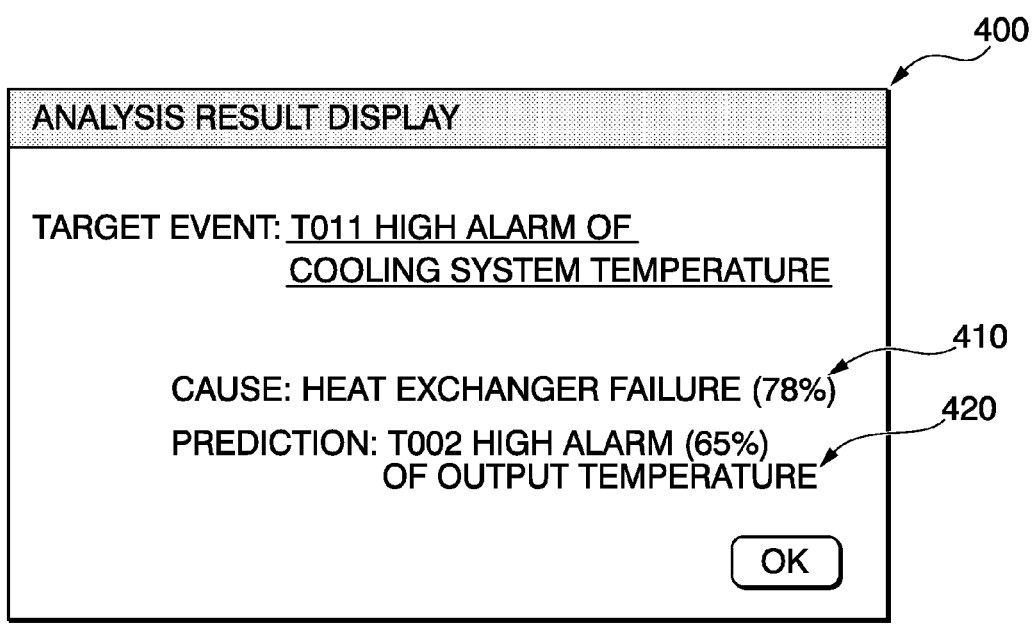
FIG. 11 is a diagram illustrating a display example of an event analysis result.
Figure 12:
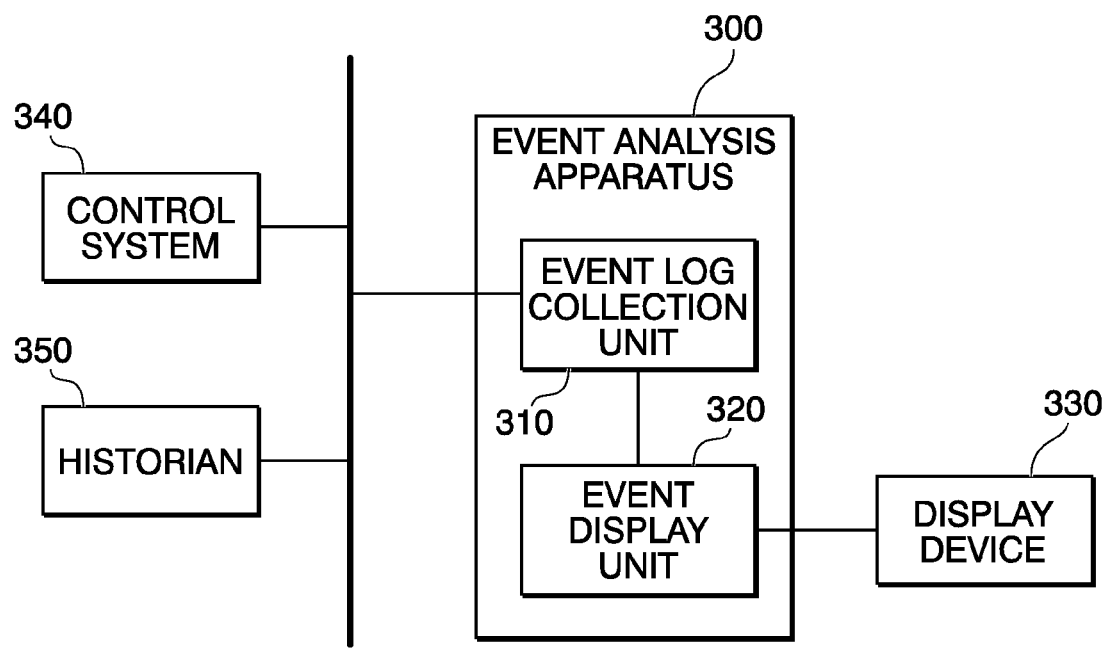
FIG. 12 is a block diagram illustrating a configuration of an event analysis apparatus of the related art.

The analysis result is displayed on the display device 160 via the analysis result display unit 140 (S303). FIG. 11 illustrates an example of a display screen 400 of the analysis result. In the example of FIG. 11, a device event (410) considered to be a cause of the device event of the analysis target and a device event (420) predicted to occur later, and probabilities of the device event (410) and the device event (420) are displayed. The device event considered to be the cause and the device event predicted to occur later may be configured to be displayed on separate screens based on the user's instructions.

As described above, according to the event analysis apparatus 100 of this embodiment, the estimation of the cause of the event and the prediction of the event to occur after the event are facilitated because it is possible to visually understand the cause-and-effect relationship between the events using the Bayesian network.

In addition, the present invention can be used in support of grouping of events as well as the cause-and-effect relationship by the construction of the Bayesian network. Specifically, it is possible to reduce the number of occurrences of the alarm in the plant by combining and handling alarms considered to have a high simultaneous occurrence probability and high linkage when an alarm of another position triggered by occurrence of an alarm of a certain position occurs (concurrent alarms).

Further, it is possible to perform analysis by combining the analysis results using the Bayesian network and the event analysis of the related art. For example, it is possible to perform analysis using the Bayesian network in order of occurrence frequency obtained by the analysis result of the related art.

What is claimed is:

1. An event analysis apparatus configured to analyze events including alarms generated in a plurality of devices and operations targeting the devices, comprising:
an event log collection unit configured to collect an event log including an occurrence date and time of the event, a device identifier (ID) of the device in which the event occurs, and an event type ID of the event;
an event log storage unit configured to convert the event log into an event matrix representing presence and absence of occurrence of each device event obtained by coupling the device ID and the event type ID in time series and save the event matrix; and
an event analysis unit configured to calculate a conditional probability between the device events to construct a Bayesian network by dividing the event matrix into blocks, each of which has a different predetermined reference time width and determining the presence and absence of the occurrence of each of the device events in each of the blocks, and decide a device event as a cause of a device event of an analysis target or a device event to be generated later using the constructed Bayesian network.

2. The event analysis apparatus according to claim 1, wherein the event log storage unit is configured to set the time series of the event matrix in a minimum time unit width of the event log.

3. The event analysis apparatus according to claim 1, wherein the event analysis unit is configured to calculate the conditional probability between the device events by calculating individual occurrence probabilities of the device events and a simultaneous occurrence probability between the device events based on the presence and absence of the occurrence of each of the device events in each of the blocks.

4. The event analysis apparatus according to claim 3, wherein the event analysis unit is configured to calculate the individual occurrence probability by setting the device event of a target, and dividing the number of the blocks in which the device event targeted has occurred by the total number of the blocks, and to calculate the simultaneous occurrence probability by setting a pair of the device events, and dividing the number of the blocks in which both the device events included in the pair have occurred by the total number of the blocks.

5. A non-transitory computer-readable storage medium storing a computer program for analyzing events including alarms generated in a plurality of devices and operations targeting the devices, wherein the computer program is executed to perform:
collecting an event log including an occurrence date and time of the event, a device ID of the device in which the event occurs, and an event type ID of the event;
converting the event log into an event matrix representing presence and absence of occurrence of each device event obtained by coupling the device ID and the event type ID in time series and saving the event matrix;
calculating a conditional probability between the device events to construct a Bayesian network by dividing the event matrix into blocks, each of which has a different predetermined reference time width and determining the presence and absence of the occurrence of each of the device events in each of the blocks, and
deciding a device event as a cause of a device event of an analysis target or a device event to be generated later using the constructed Bayesian network.

6. The non-transitory computer-readable storage medium according to claim 5, wherein the computer program is executed to perform setting the time series of the event matrix in a minimum time unit width of the event log.

7. The non-transitory computer-readable storage medium according to claim 5, wherein the computer program is executed to perform calculating the conditional probability between the device events by calculating individual occurrence probabilities of the device events and a simultaneous occurrence probability between the device events based on the presence and absence of the occurrence of each of the device events in each of the blocks.

8. The non-transitory computer-readable storage medium according to claim 7, wherein the computer program is executed calculating the individual occurrence probability by setting the device event of a target, and dividing the number of the blocks in which the device event targeted has occurred by the total number of the blocks, and calculating the simultaneous occurrence probability by setting a pair of the device events, and dividing the number of the blocks in which both the device events included in the pair have occurred by the total number of the blocks.

9. A method using a computer for analyzing events including alarms generated in a plurality of devices and operations targeting the devices, comprising:
collecting an event log including an occurrence date and time of the event, a device ID of the device in which the event occurs, and an event type ID of the event;
converting the event log into an event matrix representing presence and absence of occurrence of each device event obtained by coupling the device ID and the event type ID in time series and saving the event matrix;
calculating a conditional probability between the device events to construct a Bayesian network by dividing the event matrix into blocks, each of which has a different predetermined reference time width and determining the presence and absence of the occurrence of each of the device events in each of the blocks; and
deciding a device event as a cause of a device event of an analysis target or a device event to be generated later using the constructed Bayesian network.

10. The method according to claim 9, wherein converting the event log into the event matrix and saving the event matrix comprises setting the time series of the event matrix in a minimum time unit width of the event log.

11. The method according to claim 9, wherein calculating the conditional probability to construct the Bayesian network comprises calculating the conditional probability between the device events by calculating individual occurrence probabilities of the device events and a simultaneous occurrence probability between the device events based on the presence and absence of the occurrence of each of the device events in each of the blocks.

12. The method according to claim 11, wherein calculating the conditional probability to construct the Bayesian network comprises calculating the individual occurrence probability by setting the device event of a target, and dividing the number of the blocks in which the device event targeted has occurred by the total number of the blocks, and calculating the simultaneous occurrence probability by setting a pair of the device events, and dividing the number of the blocks in which both the device events included in the pair have occurred by the total number of the blocks.

* * * * *